United States Patent [19]

Downey

[11] Patent Number: 4,634,562
[45] Date of Patent: Jan. 6, 1987

[54] PHOTOCURABLE POLYVINYL CHLORIDE COMPOSITION

[75] Inventor: Raymond E. Downey, Akron, Ohio

[73] Assignee: The Goodyear Tire & Rubber Company, Akron, Ohio

[21] Appl. No.: 299,770

[22] Filed: Sep. 8, 1981

[51] Int. Cl.$^4$ ............ C08F 2/50; B28B 1/46; B29C 35/08
[52] U.S. Cl. ........................... 264/22; 264/310; 522/95; 522/79; 525/126
[58] Field of Search ............ 204/159.17, 159.19; 264/22

[56] References Cited

U.S. PATENT DOCUMENTS

| | | | |
|---|---|---|---|
| 3,012,001 | 12/1961 | Smith | 204/159.17 |
| 3,060,023 | 10/1962 | Burg et al. | 204/159.17 |
| 3,061,531 | 10/1962 | Smith | 204/159.17 |
| 3,133,825 | 5/1964 | Rubens | 204/159.17 |
| 3,351,604 | 11/1967 | Safford et al. | 204/159.17 |
| 3,359,193 | 12/1967 | Pinner | 204/159.17 |
| 3,476,776 | 3/1978 | Bohm et al. | 204/159.17 |
| 3,542,661 | 11/1970 | Klopfer et al. | 204/159.17 |
| 3,600,359 | 8/1971 | Miranda | 204/159.16 |
| 3,627,658 | 12/1971 | Ryffel | 204/159.17 |
| 3,652,733 | 3/1972 | Davenport | 204/159.17 |
| 4,057,431 | 11/1977 | Finelli et al. | 204/159.19 |
| 4,082,711 | 4/1978 | Andrascheck et al. | 260/31.6 |
| 4,304,838 | 12/1981 | Hasegawa et al. | 204/159.17 |

Primary Examiner—John C. Bleutge
Assistant Examiner—A. H. Koeckert
Attorney, Agent, or Firm—R. D. Thompson; J. D. Wolfe

[57] ABSTRACT

A shapable and photogellable liquid or fluid polyvinyl chloride composition comprising a blend of polyvinyl chloride with sufficient plasticizer and about 13 to 50 parts per hundred of a photopolymerizable polymer to give a liquid or fluid composition. Preferably said composition may contain a photoinitiator and a polyvinyl chloride stabilizer.

8 Claims, No Drawings

PHOTOCURABLE POLYVINYL CHLORIDE COMPOSITION

TECHNICAL FIELD

This invention relates to liquid or fluid polyvinyl chloride compositions that are shapable and photogellable in a shaped state by actinic light. More particularly this invention relates to the use of shapable and gellable liquid or fluid polyvinyl chloride compositions to produce shaped articles wherein actinic light can be used to gel the composition.

BACKGROUND

Polyvinyl chloride compositions are used in the billions of pounds annually to produce shaped articles such as film and molded articles. Generally the liquid or fluid polyvinyl chloride composition is spread on a shaping surface, for example by doctoring on a moving surface or belt, or adding to a mold which may be rotated about its axis when thin goods or hollow articles are desired. Generally the shaping surface is at a temperature or is heated to one that will gel the liquid before the temperature is raised to effect fusing of the polyvinyl chloride to produce good to optimum physical properties of the finished article. Then the shaping surface is cooled before the finished article is stripped from the shaping surface. Needless to say these methods of shaping are quite energy intensive.

DISCLOSURE AND PRACTICE OF THE INVENTION

A shapable and photogellable liquid or fluid polyvinyl chloride composition is formed by blending 100 parts of a polyvinyl chloride, preferably of the platisol type, with sufficient plasticizer and about 13 to 50 parts of a photopolymerizable polymer to give a liquid or fluid composition which can contain a photoinitiator and stabilizing amount of polyvinyl chloride stabilizer and other additives.

These shapable and photogellable liquid or fluid polyvinyl chloride compositions can be spread on a shaping surface such as a moving belt or a mold, then the spread liquid or fluid polyvinyl chloride composition can be gelled by exposure to actinic light to give a gelled composition which is then heat fused in a heat zone to develop the desired or optimum physical properties for the shaped article. The gelled composition may be removed from the shaper surface either before or after the fusing step in the heat zone.

This invention provides shaped compositions that are thermoplastics in one aspect but crosslinked in another respect as opposed to the prior art totally thermoplastic compositions. Further, this invention provides compositions wherein the composition is at least partially crosslinked prior to being heat fused and permits the nature of the shaping surface to be changed as well as the manner in which heat fusing is achieved. Thus the method and apparatus used in the shaping operation can be different from that customary in the prior art.

Any of the polyvinyl chlorides, viz solution or bulk polymerized vinyl chloride or copolyester with other comonomers, can be used to form shapable and photogellable liquid or fluid polyvinyl chloride compositions. Representative comonomers are vinyl acetate, vinyl alcohol, ethylene, propylene, butylene and acrylonitrile. The photopolymerizable polymers are those well known to the printing industry and other industries.

The term "plasticizer" is intended to include a single to multiple plasticizing agents. It is well known two or more plasticizing agents can be and normally are used to advantage in the industry. Hence the plasticizers of this invention can be any of those well known and used in making plastisols and are compatible with the photopolymerizable polymers. Representative examples are the polyesters of the phthalates and adipates such as ones disclosed in U.S. Pat. No. 4,082,711. These plasticizers are used at least in an amount sufficient to yield a liquid or fluid composition containing the photopolymerizable polymer. Usually about 5 to 50 percent by weight, and preferably 10 to 35 percent of the plasticizer will give the desired composition, depending on the amount and nature of the photopolymerizable polymer used.

Generally it is desirable to use other additives in compounding the plastisols such as fillers, light and/or heat stabilizers to mention only a few.

Any of the usual and well known polyvinyl chloride stabilizers can be used in at least a stabilizing amount to give the polyvinyl chloride stability. Generally about 3 to 10, and preferably 6 to 8, parts of stabilizer will be sufficient to stabilize the composition.

The nature of this invention can be seen more readily and appreciated by reference to the following representative examples where all the parts and percentages are by weight unless otherwise indicated.

EXAMPLE 1

A series of photogellable, liquid or fluid polyvinyl chloride compositions were made in a Hobart mixer using the recipes of Table I.

First the photopolymer and part, preferably about half, of the plasticizer is added to the mixer and blended before the polyvinyl chloride paste resin is added and is mixed to obtain a homogeneous mass. Then preferably the balance of the plasticizer, stabilizer and other additives are charged thereto and mixed until a smooth mixture is obtained. The mixture is deaerated and is placed in amber bottles or other suitable containers to protect from ultraviolet radiation until such time the composition is used to make a shaped article.

TABLE I

|  | Recipe No. | | | | | | |
| --- | --- | --- | --- | --- | --- | --- | --- |
|  | 1 | 2 | 3 | 4 | 5 | 6 | 7 |
| Polyvinyl chloride | 100 | 100 | 100 | 100 | 100 | 100 | 100 |
| Dioctyl adipate | 60 |  |  |  | 20 |  |  |
| Diisooctylphthalate |  |  | 100 | 40 |  | 20 | 40 |
| Butylbenzylphthalate |  | 80 |  |  |  |  |  |
| Ba—Cd—Zn Stabilizer | 3 |  |  |  |  |  |  |
| Epoxidized soybean oil stabilizer | 5 |  |  |  |  |  |  |
| Photopolymer 6114* | 50 | 50 | 30 | 100 |  |  |  |
| Photopolymer 250 X 1025* |  |  |  |  | 100 | 50 | 50 |
| Cure | 3 min lights | | | | | | |
|  | 12 min 160° C. | | | | | | |

TABLE I-continued

| | Recipe No. | | | | | | |
|---|---|---|---|---|---|---|---|
| | 1 | 2 | 3 | 4 | 5 | 6 | 7 |
| Tensile, $MN/m^2$ | 3.5 | 6.75 | 3.55 | 12.1 | 12.4 | 12.4 | 13.4 |
| psi | 505 | 980 | 515 | 1750 | 1800 | 1800 | 1945 |
| Elongation, % | 86 | 138 | 100 | 100 | 41 | 25 | 108 |
| Crescent Tear, lb./in. | 15 | 24 | 13 | 62 | 78 | 55 | 55 |
| Shore D | 20 | 18 | 12 | 35 | 47 | 52 | 38 |
| % Photopolymer | 23 | 21 | 13 | 40 | 44 | 29.5 | 25.2 |

*Liquid polyetherurethane photopolymer of Phasar TM type having acrylic type unsaturation.

Instead of the Phasar TM polyurethane those available as Uvithane TM and others can be used. The fatty acid soaps particularly desirable are of barium, cadmium, strontium and related heavy metals and mixtures of these metal soaps such as Ba/Cd/Sr stabilizers as the stabilizers in this invention. The heavy metal metal stearate soaps are particularly desirable. Likewise the well known organic tin stabilizers for polyvinyl chloride may be used also.

Examples of suitable known photopolymerization initiators include benzoins such as benzoin, α-methylbenzoin, benzoin methyl ether, benzoin ethyl ether, α-phenylbenzoin, α-allylbenzoin, phenones such as acetophenone, benzophenone, anthraquinones such as anthraquinone, chloranthraquinone, methylanthraquinone, tert-butylanthraquinone, disulphides such as diphenyl disulphide, tetraethylthiuram disulphide; diketones such as benzyl, diacetyl; uranyl salts such as uranyl nitrate, uranyl propionate; 2-naphthalene sulfonyl chloride; metal halides such as silver chloride, silver bromide, stannic chloride, stannous chloride and titanium chloride.

These photopolymerization initiators are used in an amount of from 0.001 to 10 percent by weight based upon the total weight of the photopolymerizable composition. When the amount of the photopolymerization initiator is less than 0.001 percent by weight the photopolymerization reaction is greatly retarded and is too slow for practical commercial purposes. On the other hand, amounts of initiator of more than 10 percent by weight do not significantly increase the reaction and would be uneconomical. Usually 2 to 6 percent is used.

Activation of the above photoinitiators is best achieved by exposure to ultraviolet light from a mercury or Xenon bulb. The source used in the example was a bank of ten Sylvania F40BL ultraviolet fluorescent bulbs with each test specimen being located beneath the bulbs. The power output could be adjusted to 850 to 100 microwatts per square centimeter and the exposure was for 3 minutes.

Although liquid ethylenically unsaturated polyurethane compositions such as those of U.S. Pat. No. 4,057,431 can be used it is preferred to use the solid ethylenically unsaturated polyurethane compositions, either of the polyether, polyester or polyhydrocarbon polyol types. A representative examples of these commercially available solid polyurethane is Uvithane TM 788, of Thiokol Corporation, which is a low melting solid having a viscosity at 71° C. of 300 to 750 poises.

The composition of this invention can be placed in a suitable transparent mold such as a clear fluorocarbon and rotated to spread the liquid composition on the walls of the mold and exposed to actinic radiation such as X-rays to gel the composition and then cure the gel composition with heat as in a heat zone about 150° to 180° C. for 8 to 12 minutes, and remove the cured shaped article from the heat zone. The physical properties of the radiation gelled and heat cured samples compared very favorably with a sample produced by heat gelling and heat cure.

One benefit of adding photopolymer to the plastisol is it has a stabilizing effect on the viscosity of the mixture whereas the normal polyvinyl chloride plastisol tends to have a "marching" viscosity that increases, in some cases even doubling in a very short time.

While certain representative embodiments and details have been shown for the purpose of illustrating the invention it will be apparent to those skilled in this art that various changes and modifications may be made therein without departing from the scope of the invention.

I claim:

1. A polyvinyl chloride composition composed of 100 parts polyvinyl chloride, at least sufficient plasticizer to form a plastisol with said polyvinyl chloride, stabilizer amounts of a polyvinyl chloride stabilizer, about 13 to 50 parts of a photopolymerizable polymer and a photoinitiator.

2. The polyvinyl chloride composition of claim 1 wherein the plasticizer is present in 15 to 20 percent by weight and the photopolymerizable polymer is present in 30 to 40 percent by weight based on polyvinyl chloride.

3. A method of forming shaped articles from a liquid polyvinyl chloride composition comprising (a) forming a liquid polyvinyl chloride composition composed of polyvinyl chloride, at least sufficient plasticizer to yield a plastisol with the polyvinyl chloride, a photopolymerizable polymer and photoinitiator, (b) spreading said liquid composition against a shaping surface, (c) exposing said spread liquid composition to sufficient actinic light to give a gelled composition, (d) curing the gelled composition in a heat zone, and (e) removing said shaped article from the heat zone.

4. The method of claim 3 wherein the gelled composition is removed from the shaping surface and heating to fuse the gelled composition.

5. The method of claim 3 wherein the shaping surface is a rotating mold.

6. The method of claim 5 wherein the shaping surface of the rotating mold passes ultraviolet rays to expose polymerizable polymer to said rays.

7. The method of claim 3 where the shaping surface passes X rays, gamma rays or beta rays.

8. The polyvinyl chloride composition of claim 1 wherein the photopolymerizable polymer is an ethylenically unsaturated polyurethane.

* * * * *